United States Patent
Broome et al.

(10) Patent No.: US 11,941,129 B2
(45) Date of Patent: Mar. 26, 2024

(54) UTILIZING CONTACT INFORMATION FOR DEVICE RISK ASSESSMENT

(71) Applicant: Capital One Services, LLC, McLean, VA (US)

(72) Inventors: William Broome, Taylorsville, GA (US); Nicholas Capurso, Tysons Corner, VA (US); Timothy Tran, Springfield, VA (US); Vu Thuy Ngo, Chester, VA (US)

(73) Assignee: Capital One Services, LLC, McLean, VA (US)

( * ) Notice: Subject to any disclaimer, the term of this patent is extended or adjusted under 35 U.S.C. 154(b) by 103 days.

(21) Appl. No.: 17/218,368

(22) Filed: Mar. 31, 2021

(65) Prior Publication Data

US 2022/0318394 A1 Oct. 6, 2022

(51) Int. Cl.
| | | |
|---|---|---|
| G06F 21/00 | (2013.01) | |
| G06F 21/31 | (2013.01) | |
| G06F 21/44 | (2013.01) | |
| G06F 21/45 | (2013.01) | |
| G06F 21/57 | (2013.01) | |
| G06F 21/62 | (2013.01) | |

(52) U.S. Cl.
CPC ............ *G06F 21/577* (2013.01); *G06F 21/31* (2013.01); *G06F 21/44* (2013.01); *G06F 21/45* (2013.01); *G06F 21/629* (2013.01); *G06F 2221/2113* (2013.01); *G06F 2221/2141* (2013.01)

(58) Field of Classification Search
CPC ..... G06F 2221/2113; G06F 2221/2141; G06F 21/44; G06F 21/577; G06F 21/31; G06F 21/45; G06F 21/629; G06F 21/57; G06F 21/73
See application file for complete search history.

(56) References Cited

U.S. PATENT DOCUMENTS

| | | |
|---|---|---|
| 9,119,067 B2 | 8/2015 | Santamaria et al. |
| 10,419,418 B2 | 9/2019 | Grajek et al. |

(Continued)

FOREIGN PATENT DOCUMENTS

| | | |
|---|---|---|
| CN | 108510282 A | 9/2018 |
| CN | 111711614 A | 9/2020 |

*Primary Examiner* — Ghazal B Shehni
(74) *Attorney, Agent, or Firm* — Sterne, Kessler, Goldstein & Fox P.L.L.C.

(57) ABSTRACT

Embodiments disclosed are directed to a computing system that performs steps to perform enhanced device fingerprinting using user contacts data. The computing system receives, from an application, a first plurality of device attributes identifying a client device on which the application is being used. The first plurality of device attributes includes first device identification data and first user contacts data. Subsequently, when a user is attempting to perform a transaction using the application on the client device, the computing system receives, from the application, a second plurality of device attributes identifying the client device on which the application is being used. The second plurality of device attributes includes second device identification data and second user contacts data. The computing system compares the second plurality of device attributes to the first plurality of device attributes to determine whether the user is authorized to perform the transaction.

14 Claims, 5 Drawing Sheets

(56) References Cited

U.S. PATENT DOCUMENTS

| | | |
|---|---|---|
| 10,511,974 B2 | 12/2019 | Skvortsov et al. |
| 10,733,646 B2 | 8/2020 | Douglas et al. |
| 10,754,941 B2 | 8/2020 | Angal |
| 2010/0107225 A1* | 4/2010 | Spencer .............. H04W 12/069 |
| | | 726/4 |
| 2012/0084352 A1* | 4/2012 | Cho ........................ G06F 21/53 |
| | | 715/810 |
| 2014/0122720 A1* | 5/2014 | Jung .................. H04L 41/5054 |
| | | 709/225 |
| 2014/0123300 A1* | 5/2014 | Jung ....................... G06F 21/44 |
| | | 726/26 |
| 2017/0206525 A1 | 7/2017 | Sylvain |
| 2018/0357105 A1* | 12/2018 | Rishabh ................ G06F 9/5033 |
| 2019/0205862 A1* | 7/2019 | Xu ........................ G06Q 20/322 |
| 2020/0184048 A1* | 6/2020 | Toth ........................ G06N 20/00 |
| 2020/0403947 A1* | 12/2020 | Fogu ....................... G06Q 50/01 |
| 2022/0043893 A1* | 2/2022 | Goecke ................. G06F 21/629 |
| 2022/0166762 A1* | 5/2022 | Srour ..................... G01K 7/021 |
| 2022/0201010 A1* | 6/2022 | Tarsauliya ............. G06F 21/604 |
| 2022/0207163 A1* | 6/2022 | Gentleman ......... G06F 21/6218 |
| 2022/0248190 A1* | 8/2022 | Garg ................. H04M 3/42068 |

* cited by examiner

UTILIZING CONTACT INFORMATION FOR DEVICE RISK ASSESSMENT

TECHNICAL FIELD

Embodiments relate to device fingerprinting, specifically a system that utilizes user contacts information to enhance device fingerprinting.

BACKGROUND

Device fingerprinting is a technique that many applications use to uniquely identify a device in their ecosystem. Device fingerprinting is achieved through the use of device fingerprints. Device fingerprints are amalgams of multiple sources of information available on a device. These amalgams can include a variety of information about the device, such as a device serial number, a device name, a device type, or other accessible device information on the device. Device fingerprints are useful in identifying a device and establishing confidence in a device (i.e., establishing device stability). Identifying and establishing confidence in a device is important because once a device is identified, and confidence is established in the device, other devices in the ecosystem may be assured that when sending information to the device, the data they are sending will go to an intended destination and is unlikely to be compromised.

Device fingerprints, however, can have drawbacks. For example, many of the sources of information used in device fingerprints may be compromised, resulting in unauthorized devices imitating a device, and thus compromising a device. Another example is that a device name and serial number may become known by nefarious actors, who can use that information to set up an unauthorized device to imitate the compromised device and intercept data to which they should not have access.

Additionally, these drawbacks can negatively impact device risk assessments. Device risk assessments attempt to determine the trustworthiness of a mobile device by inspecting a number of parameters about the device, such as a device fingerprint generated based on hardware or software identifiers (IDs) (e.g., a Wi-Fi MAC address, an IP address, telephony fields, etc.). These fields often have varying amounts of availability to mobile application developers based on device model or operating system. For example, mobile operating systems can be very restrictive in what hardware or software IDs are exposed to application developers.

SUMMARY

Provided herein are system, apparatus, article of manufacture, method and/or computer program product embodiments, and/or combinations and sub-combinations thereof, for device fingerprinting.

Several embodiments are directed to computer-implemented methods for device fingerprinting. For example, a computer-implemented method can include receiving, at a first time by one or more computing devices and from an application, a first plurality of device attributes identifying a client device on which the application is being used. The first plurality of device attributes can include first device identification data and first user contacts data. The computer-implemented method can further include receiving, at a second time by the one or more computing devices and from the application, an indication that a user is attempting to perform a transaction using the application on the client device. The computer-implemented method can further include requesting, by the one or more computing devices and in response to receiving the indication, a second plurality of device attributes identifying the client device on which the application is being used. The second plurality of device attributes can be different than the first plurality of device attributes and can include second device identification data and second user contacts data. The computer-implemented method can further include receiving, by the one or more computing devices and in response to requesting the second plurality of device attributes, the second plurality of device attributes. The computer-implemented method can further include comparing, by the one or more computing devices, the second plurality of device attributes to the first plurality of device attributes. The computer-implemented method can further include determining, by the one or more computing devices and based on the comparing the second plurality of device attributes to the first plurality of device attributes, a device risk score indicating whether the user is authorized to perform the transaction using the application.

In several embodiments, the computer-implemented method can further include determining, by the one or more computing devices, that the device risk score is equal to or greater than a maximum device risk score threshold value. In several embodiments, the computer-implemented method can further include preventing, by the one or more computing devices and in response to determining that the device risk score is equal to or greater than the maximum device risk score threshold value, the user from performing the transaction using the application.

In several embodiments, the computer-implemented method can further include determining, by the one or more computing devices, that the device risk score is less than a maximum device risk score threshold value and equal to or greater than a minimum device risk score threshold value. In several embodiments, the computer-implemented method can further include performing, by the one or more computing devices and in response to determining that the device risk score is less than the maximum device risk score threshold value and equal to or greater than the minimum device risk score threshold value, a supplemental authentication technique to determine whether the user is authorized to perform the transaction using the application. In several embodiments, the first user contacts data can include first emergency contacts data, the second user contacts data can include second emergency contacts data, the performing the supplemental authentication technique can include: determining, by the one or more computing devices, that a first portion of the first emergency contacts data matches a second portion of the second emergency contacts data; and authorizing, by the one or more computing devices and in response to determining that the first portion of the first emergency contacts data matches the second portion of the second emergency contacts data, the user to perform the transaction using the application. In several embodiments, the first user contacts data can include first authorized users data, the second user contacts data can include second authorized users data, and the performing the supplemental authentication technique can include: determining, by the one or more computing devices, that a first portion of the first authorized users data matches a second portion of the second authorized users data; and authorizing, by the one or more computing devices and in response to determining that the first portion of the first authorized users data matches the second portion of the second authorized users data, the user to perform the transaction using the application. In several embodiments, the first user contacts data can include first self-contact data for a primary user of the client device, the second user contacts data can include second self-contact data for the primary user of the client device, and the performing the supplemental authentication technique can include: determining, by the one or more computing devices, that the first self-contact data matches the second self-contact data; and authorizing, by the one or more computing devices and in response to determining that the first self-contact data matches the second self-contact data, the user to perform the transaction using the application.

In several embodiments, the computer-implemented method can further include determining, by the one or more computing devices, that the device risk score is less than a minimum device risk score threshold value. In several embodiments, the computer-implemented method can further include authorizing, by the one or more computing devices and in response to determining that the device risk score is less than the minimum device risk score threshold value, the user to perform the transaction using the application.

In several embodiments, the application can be a first application, the client device can be a first client device, the indication can be a first indication, the transaction can be a first transaction, and the device risk score can be a first device risk score. In several embodiments, the computer-implemented method can further include receiving, at a third time by the one or more computing devices and from a second application, a second indication that the user is attempting to perform a second transaction using the second application on a second client device. In several embodiments, the computer-implemented method can further include requesting, by the one or more computing devices and in response to receiving the second indication, a third plurality of device attributes identifying the second client device on which the second application is being used. In several embodiments, the third plurality of device attributes can be different than the first plurality of device attributes and can include third device identification data and third user contacts data. In several embodiments, the computer-implemented method can further include receiving, by the one or more computing devices and in response to requesting the third plurality of device attributes, the third plurality of device attributes. In several embodiments, the computer-implemented method can further include comparing, by the one or more computing devices, the third plurality of device attributes to the first plurality of device attributes. In several embodiments, the computer-implemented method can further include determining, by the one or more computing devices and based on the comparing the third plurality of device attributes to the first plurality of device attributes, a second device risk score indicating whether the user is authorized to perform the second transaction using the second application.

Several embodiments are directed to non-transitory computer readable media. For example, a non-transitory computer readable medium can include instructions for causing a processor to perform operations for device fingerprinting. The operations can include receiving, at a first time and from an application, a first plurality of device attributes identifying a client device on which the application is being used. The first plurality of device attributes can include first device identification data and first user contacts data. The operations can further include receiving, at a second time and from the application, an indication that a user is attempting to perform a transaction using the application on the client device. The operations can further include requesting, in response to receiving the indication, a second plurality of device attributes identifying the client device on which the application is being used. The second plurality of device attributes can be different than the first plurality of device attributes and can include second device identification data and second user contacts data. The operations can further include receiving, in response to requesting the second plurality of device attributes, the second plurality of device attributes. The operations can further include comparing the second plurality of device attributes to the first plurality of device attributes. The operations can further include determining, based on the comparing the second plurality of device attributes to the first plurality of device attributes, a device risk score indicating whether the user is authorized to perform the transaction using the application.

In several embodiments, the operations can further include determining that the device risk score is equal to or greater than a maximum device risk score threshold value. In several embodiments, the operations can further include preventing, in response to determining that the device risk score is equal to or greater than the maximum device risk score threshold value, the user from performing the transaction using the application.

In several embodiments, the operations can further include determining that the device risk score is less than a maximum device risk score threshold value and equal to or greater than a minimum device risk score threshold value. In several embodiments, the operations can further include performing, in response to determining that the device risk score is less than the maximum device risk score threshold value and equal to or greater than the minimum device risk score threshold value, a supplemental authentication technique to determine whether the user is authorized to perform the transaction using the application. In several embodiments, the first user contacts data can include first emergency contacts data, the second user contacts data can include second emergency contacts data, and the operations can further include performing the supplemental authentication technique by: determining that a first portion of the first emergency contacts data matches a second portion of the second emergency contacts data; and authorizing, in response to determining that the first portion of the first emergency contacts data matches the second portion of the second emergency contacts data, the user to perform the transaction using the application. In several embodiments, the first user contacts data can include first authorized users data, the second user contacts data can include second authorized users data, and the operations can further include performing the supplemental authentication technique by: determining that a first portion of the first authorized users data matches a second portion of the second authorized users data; and authorizing, in response to determining that the first portion of the first authorized users data matches the second portion of the second authorized users data, the user to perform the transaction using the application. In several embodiments, the first user contacts data can include first self-contact data for a primary user of the client device, the second user contacts data can include second self-contact data for the primary user of the client device, and the operations can further include performing the supplemental authentication technique by: determining that the first self-contact data matches the second self-contact data; and authorizing, in response to determining that the first self-contact data matches the second self-contact data, the user to perform the transaction using the application.

In several embodiments, the operations can further include determining that the device risk score is less than a minimum device risk score threshold value. In several embodiments, the operations can further include authorizing, in response to determining that the device risk score is less than the minimum device risk score threshold value, the user to perform the transaction using the application.

In several embodiments, the application can be a first application, the client device can be a first client device, the indication can be a first indication, the transaction can be a first transaction, the device risk score can be a first device risk score, and the operations can further include receiving, at a third time and from a second application, a second indication that the user is attempting to perform a second transaction using the second application on a second client device. In several embodiments, the operations can further include requesting, in response to receiving the second indication, a third plurality of device attributes identifying the second client device on which the second application is being used. In several embodiments, the third plurality of device attributes can be different than the first plurality of device attributes and can include third device identification data and third user contacts data. In several embodiments, the operations can further include receiving, in response to requesting the third plurality of device attributes, the third plurality of device attributes. In several embodiments, the operations can further include comparing the third plurality of device attributes to the first plurality of device attributes. In several embodiments, the operations can further include determining, based on the comparing the third plurality of device attributes to the first plurality of device attributes, a second device risk score indicating whether the user is authorized to perform the second transaction using the second application.

Several embodiments are directed to computing systems for device fingerprinting. For example, a computing system can include a storage unit configured to store instructions. The computing system can further include a communication unit, coupled to the storage unit, configured to process the stored instructions to receive, at a first time and from an application, a first plurality of device attributes identifying a client device on which the application is being used. The first plurality of device attributes can include first device identification data and first user contacts data. The communication unit can be further configured to process the stored instructions to receive, at a second time and from the application, an indication that a user is attempting to perform a transaction using the application on the client device. The communication unit can be further configured to process the stored instructions to transmit, in response to a receipt of the indication, a request for a second plurality of device attributes identifying the client device on which the application is being used. The second plurality of device attributes can be different than the first plurality of device attributes and can include second device identification data and second user contacts data. The communication unit can be further configured to process the stored instructions to receive, in response to a transmission of the request for the second plurality of device attributes, the second plurality of device attributes. The computing system can further include a control unit, coupled to the storage unit, configured to process the stored instructions to compare the second plurality of device attributes to the first plurality of device attributes. The control unit can be further configured to process the stored instructions to determine, based on a comparison of the second plurality of device attributes to the first plurality of device attributes, a device risk score indicating whether the user is authorized to perform the transaction using the application.

In several embodiments, the control unit can be further configured to process the stored instructions to determine that the device risk score is equal to or greater than a maximum device risk score threshold value. In several embodiments, the control unit can be further configured to process the stored instructions to prevent, in response to a determination that the device risk score is equal to or greater than the maximum device risk score threshold value, the user from performing the transaction using the application.

In several embodiments, the control unit can be further configured to process the stored instructions to determine that the device risk score is less than a maximum device risk score threshold value and equal to or greater than a minimum device risk score threshold value. In several embodiments, the control unit can be further configured to process the stored instructions to perform, in response to a determination that the device risk score is less than the maximum device risk score threshold value and equal to or greater than the minimum device risk score threshold value, a supplemental authentication technique to determine whether the user is authorized to perform the transaction using the application.

In several embodiments, the application can be a first application, the client device can be a first client device, the request can be a first request, the indication can be a first indication, the transaction can be a first transaction, and the device risk score can be a first device risk score. In several embodiments, the communication unit can be further configured to process the stored instructions to receive, at a third time and from a second application, a second indication that the user is attempting to perform a second transaction using the second application on a second client device. In several embodiments, the communication unit can be further configured to process the stored instructions to transmit, in response to a receipt of the second indication, a second request for a third plurality of device attributes identifying the second client device on which the second application is being used. In several embodiments, the third plurality of device attributes can be different than the first plurality of device attributes and can include third device identification data and third user contacts data. In several embodiments, the communication unit can be further configured to process the stored instructions to receive, in response to a transmission of the second request, the third plurality of device attributes. In several embodiments, the control unit can be further configured to process the stored instructions to compare the third plurality of device attributes to the first plurality of device attributes. In several embodiments, the control unit can be further configured to process the stored instructions to determine, based on a comparison of the third plurality of device attributes to the first plurality of device attributes, a second device risk score indicating whether the user is authorized to perform the second transaction using the second application.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

DETAILED DESCRIPTION

Figure 1:
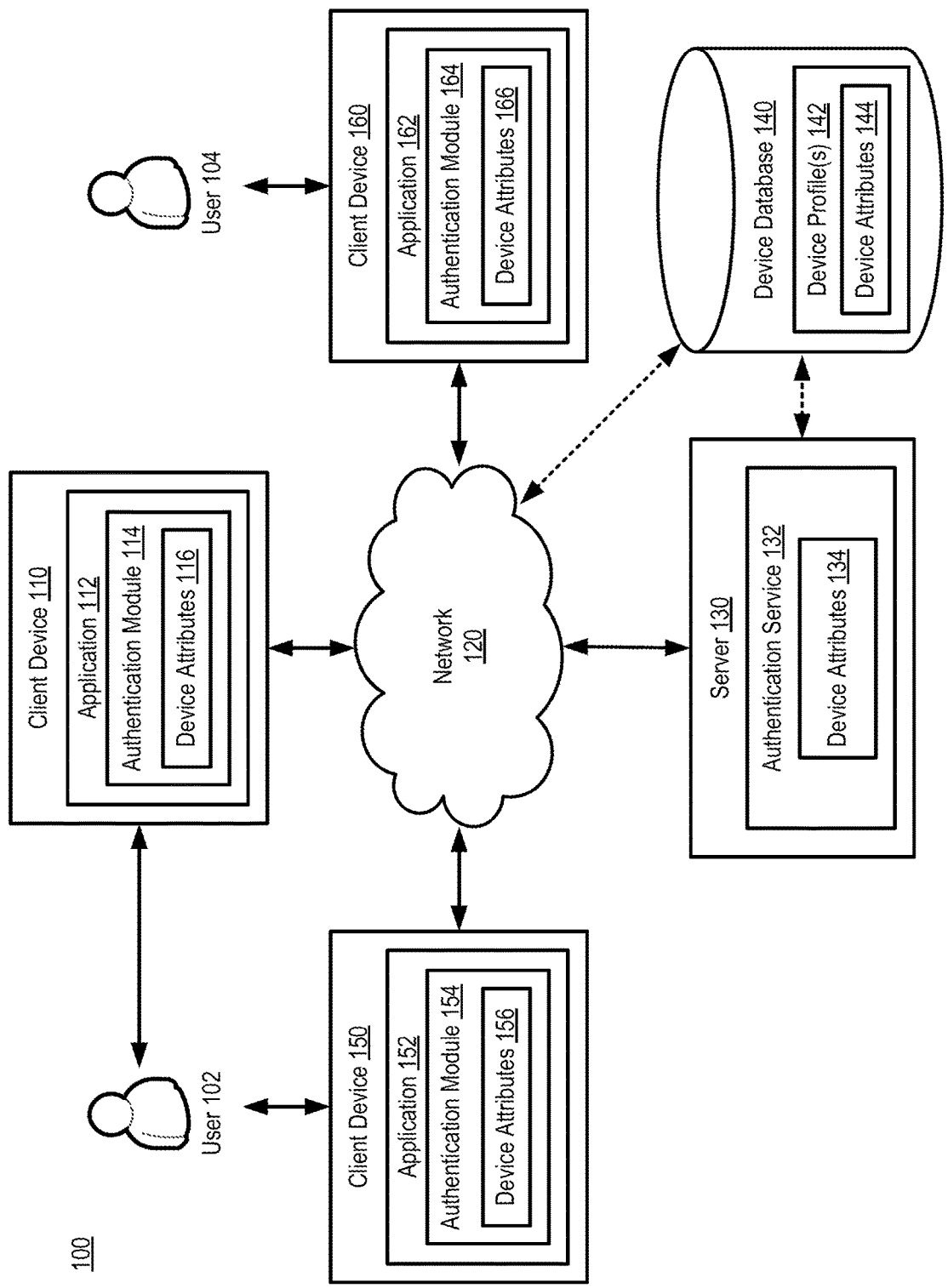
FIG. 1 is an example system for enhanced device fingerprinting according to some embodiments.

Embodiments disclosed herein relate to systems and methods for enhanced device fingerprinting. The systems and methods disclosed herein may achieve enhanced device fingerprinting by utilizing user contacts information (e.g., the user's electronic address book) stored on, or in association with, the client device to uniquely identify the client device in a network environment. In some aspects, adding additional parameters, especially parameters that are readily available for mobile apps to collect such as user contacts information, to the device fingerprint inherently makes device fingerprinting and risk assessment more flexible and secure. Further, because user contacts information is relatively stable and does not change often, this information can be used to provide one or more additional parameters in the device fingerprint to associate a particular device fingerprint with the user who owns the device.

Embodiments disclosed are directed to a computing system that performs the aforementioned enhanced device fingerprinting. The computing system can be configured to receive, at a first time and from an application, a first plurality of device attributes identifying a client device on which the application is being used. The first plurality of device attributes can include first device identification data and first user contacts data. Subsequently, the computing system can be configured to receive, at a second time and from the application, an indication that a user is attempting to perform a transaction using the application on the client device. In response to a receipt of the indication, the computing system can be further configured to generate and transmit, to the application, a request for a second plurality of device attributes identifying the client device on which the application is being used. The second plurality of device attributes can be different than the first plurality of device attributes and include second device identification data and second user contacts data. In response to a transmission of the request, the computing system can be further configured to receive, from the application, the second plurality of device attributes. The computing system can be further configured to compare the second plurality of device attributes to the first plurality of device attributes. The computing system can be further configured to determine a device risk score based on a comparison of the second plurality of device attributes to the first plurality of device attributes. The device risk score can indicate whether the user is authorized to perform the transaction using the application.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in embodiments of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

System Overview and Function

FIG. 1 is an example system 100 for enhanced device fingerprinting according to some embodiments. In several embodiments, system 100 can include a client device 110 associated with a user 102, a client device 150 also associated with the user 102, a client device 160 associated with a user 104, a network 120, a server 130, and a device database 140. In several embodiments, the client device 110 can further include an application 112 which, in several embodiments, includes an authentication module 114 having access to a plurality of device attributes 116 stored on, or in association with, the client device 110. In several embodiments, the client device 150 can further include an application 152 which, in several embodiments, includes an authentication module 154 having access to a plurality of device attributes 156 stored on, or in association with, the client device 150. In several embodiments, the client device 160 can further include an application 162 which, in several embodiments, includes an authentication module 164 having access to a plurality of device attributes 166 stored on, or in association with, the client device 160. In several embodiments, the server 130 can further include an authentication service 132.

The client device 110, the client device 150, and the client device 160 may be any of a variety of centralized or decentralized computing devices. For example, one or more of the client device 110, the client device 150, and the client device 160 may be a mobile device, a laptop computer, or a desktop computer. In several embodiments, one or more of the client device 110, the client device 150, and the client device 160 can function as a stand-alone device separate from other devices of the system 100. The term "stand-alone" can refer to a device being able to work and operate independently of other devices. In several embodiments, the client device 110, the client device 150, and the client device 160 can store and execute the application 112, the application 152, and the application 162, respectively.

Each of the application 112, the application 152, and the application 162 may refer to a discrete software that provides some specific functionality. For example, the application 112 and the application 152 each may be a mobile application that allows the user 102 to perform some functionality, whereas the application 162 may be a mobile application that allows the user 104 to perform some functionality. The functionality can, for example and without limitation, allow the user 102, the user 104, or both to perform banking, data transfers, or commercial transactions. In other embodiments, one or more of the application 112, the application 152, and the application 162 may be a desktop application that allows the user 102 or the user 104 to perform the aforementioned functionalities.

In several embodiments, the client device 110, the client device 150, and the client device 160 can be coupled to the server 130 via a network 120. The server 130 may be part of a backend computing infrastructure, including a server infrastructure of a company or institution, to which the application 112, the application 152, and the application 162 belong. While the server 130 is described and shown as a single component in FIG. 1, this is merely an example. In some embodiments, the server 130 can comprise a variety of centralized or decentralized computing devices. For example, the server 130 may include a mobile device, a laptop computer, a desktop computer, grid-computing resources, a virtualized computing resource, cloud computing resources, peer-to-peer distributed computing devices, a server farm, or a combination thereof. The server 130 may be centralized in a single room, distributed across different rooms, distributed across different geographical locations, or embedded within the network 120. While the devices comprising the server 130 can couple with the network 120 to communicate with the client device 110, the client device 150, and the client device 160, the devices of the server 130 can also function as stand-alone devices separate from other devices of the system 100.

In several embodiments, if the server 130 is implemented using cloud computing resources, the cloud computing resources may be resources of a public or private cloud. Examples of a public cloud include, without limitation, Amazon Web Services (AWS)™, IBM Cloud™, Oracle Cloud Solutions™, Microsoft Azure Cloud™, and Google Cloud™. A private cloud refers to a cloud environment similar to a public cloud with the exception that it is operated solely for a single organization.

In several embodiments, the server 130 can couple to the client device 110 to allow the application 112 to function. For example, in several embodiments, both the client device 110 and the server 130 can have at least a portion of the application 112 installed thereon as instructions on a non-transitory computer readable medium. The client device 110 and the server 130 can both execute portions of the application 112 using client-server architectures, to allow the application 112 to function.

In several embodiments, the server 130 can couple to the client device 150 to allow the application 152 to function. For example, in several embodiments, both the client device 150 and the server 130 can have at least a portion of the application 152 installed thereon as instructions on a non-transitory computer readable medium. The client device 150 and the server 130 can both execute portions of the application 152 using client-server architectures, to allow the application 152 to function.

In several embodiments, the server 130 can couple to the client device 160 to allow the application 162 to function. For example, in several embodiments, both the client device 160 and the server 130 can have at least a portion of the application 162 installed thereon as instructions on a non-transitory computer readable medium. The client device 160 and the server 130 can both execute portions of the application 162 using client-server architectures, to allow the application 162 to function.

In several embodiments, the server 130 can transmit requests and other data to, and receive indications, device attributes, and other data from, the authentication module 114, the authentication module 154, and the authentication module 164 (and in effect the client device 110, the client device 150, and the client device 160, respectively) via the network 120. The network 120 refers to a telecommunications network, such as a wired or wireless network. The network 120 can span and represent a variety of networks and network topologies. For example, the network 120 can include wireless communications, wired communications, optical communications, ultrasonic communications, or a combination thereof. For example, satellite communications, cellular communications, Bluetooth, Infrared Data Association standard (IrDA), wireless fidelity (WiFi), and worldwide interoperability for microwave access (WiMAX) are examples of wireless communications that may be included in the network 120. Cable, Ethernet, digital subscriber line (DSL), fiber optic lines, fiber to the home (FTTH), and plain old telephone service (POTS) are examples of wired communications that may be included in the network 120. Further, the network 120 can traverse a number of topologies and distances. For example, the network 120 can include a direct connection, personal area network (PAN), local area network (LAN), metropolitan area network (MAN), wide area network (WAN), or a combination thereof. For illustrative purposes, in the embodiment of FIG. 1, the system 100 is shown with the client device 110, the client device 150, the client device 160, and the server 130 as end points of the network 120. This, however, is an example and it is to be understood that the system 100 can have a different partition between the client device 110, the client device 150, the client device 160, the server 130, and the network 120. For example, the client device 110, the client device 150, the client device 160, and the server 130 can also function as part of the network 120.

In several embodiments, the client device 110, the client device 150, and the client device 160 can include at least the authentication module 114, the authentication module 154, and the authentication module 164, respectively. In several embodiments, each of the authentication module 114, the authentication module 154, and the authentication module 164 may be a module of the application 112, the application 152, and the application 162, respectively. In several embodiments, the authentication module 114, the authentication module 154, and the authentication module 164 can enable the client device 110, the client device 150, and the client device 160, respectively, and/or the application 112, the application 152, and the application 162, respectively, to receive requests and other data from, and transmit device attributes, indications, and other data to, the authentication service 132 and/or the server 130 via the network 120. In several embodiments, this may be done by having the authentication module 114, the authentication module 154, and the authentication module 164 couple to the authentication service 132 via an API to transmit and receive data as a variable or parameter.

In several embodiments, the authentication module 114, the authentication module 154, and the authentication module 164 can further enable collection of a plurality of device attributes 116, a plurality of device attributes 156, and a plurality of device attributes 166, respectively. Each of the plurality of device attributes 116, the plurality of device attributes 156, and the plurality of device attributes 166 refers to a collection of information about the client device 110, the client device 150, and the client device 160, respectively, that allows fingerprinting of the client device 110, the client device 150, and the client device 160, respectively.

In several embodiments, the plurality of device attributes 116 can identify the client device 110 on which the application 112 is being used by the user 102. The plurality of device attributes 116 can include device identification data associated with the client device 110 and user contacts data associated with the user 102. The device identification data can include, for example and without limitation, a device serial number, a device name, a device type, hardware or software IDs (e.g., a Wi-Fi MAC address, an IP address, telephony fields, etc.), any other accessible device information specific to the client device 110 that can help identify the client device 110, or any combination thereof. The user contacts data can include, for example and without limitation, emergency contacts data, self-contact data, number-of-contacts data, authorized users data, any other suitable data, or any combination thereof. The user contacts data can include, for example and without limitation, the name, phone number, address, nickname, email address, any other suitable contact information, or a combination thereof of one or more persons who were designated by the user 102 as a contact in the client device 110. The emergency contacts data can include, for example and without limitation, the name, phone number, any other suitable contact information, or a combination thereof of one or more persons who were designated by the user 102 as an emergency contact in the client device 110. The self-contact data can include, for example and without limitation, the name, phone number, address, nickname, email address, account (e.g., Apple ID), any other suitable contact information, or a combination thereof of the user 102 who was designated as the owner or primary user in the client device 110. The number-of-contacts data can include, for example and without limitation, the total amount of persons who were designated by the user 102 as a contact in the client device 110. The authorized users data can include, for example and without limitation, the name, phone number, any other suitable contact information, or a combination thereof of one or more persons who were designated by the user 102 as an additional user (e.g., in addition to user 102) who is authorized by the user 102 to perform a transaction using the application 112.

In several embodiments, the emergency contacts data, self-contact data, number-of-contacts data, authorized users data, any other suitable data, or any combination thereof can be compared across two points in time from the same device (e.g., client device 110). In several embodiments, the emergency contacts data, self-contact data, number-of-contacts data, authorized users data, any other suitable data, or any combination thereof can be compared across two different devices, such as a user's registered or existing device and the same user's new device (e.g., client device 110 and client device 150). In several embodiments, the emergency contacts data, self-contact data, number-of-contacts data, authorized users data, any other suitable data, or any combination thereof can be compared with reference to a user's settings in application 112. As a result, if application 112 includes, for example, an authorized user or emergency contact, then a comparison of the contacts in application 112 with the contacts in client device 110 can provide an indicator of low device risk.

In several embodiments, the plurality of device attributes 116 may be obtained by the authentication module 114 from the operating system of the client device 110 and/or a storage of the client device 110 storing the plurality of device attributes 116. In several embodiments, the authentication module 114, once it collects the plurality of device attributes 116, can combine the plurality of device attributes 116 in a data structure, such as a vector, table, or other data object.

In several embodiments, the plurality of device attributes 156 and the plurality of device attributes 166 can include any of the features or structures described herein with reference to the plurality of device attributes 116 but modified to be specific to the client device 150 and the client device 160, respectively. For example, the plurality of device attributes 156 can identify the client device 150 on which the application 152 is being used by the user 102. In other examples, the plurality of device attributes 166 can identify the client device 160 on which the application 162 is being used by the user 104. How the plurality of device attributes 116, the plurality of device attributes 156, and the plurality of device attributes 166 are used in the system 100 will be discussed further below.

In several embodiments, the server 130 can include at least the authentication service 132. In several embodiments, the authentication service 132 may be implemented as a software application on the server 130. In several embodiments, the authentication service 132 can enable receipt of the plurality of device attributes 116 from the authentication module 114, the plurality of device attributes 156 from the authentication module 154, and the plurality of device attributes 166 from the authentication module 164. This may be done, for example, by having the authentication service 132 couple to the authentication module 114, the authentication module 154, and the authentication module 164 via a respective API to receive the plurality of device attributes 116, the plurality of device attributes 156, and the plurality of device attributes 166, respectively, as a variable or parameter. In several embodiments, the authentication service 132 can further enable storage of the plurality of device attributes 116, the plurality of device attributes 156, and the plurality of device attributes 166 in a local storage device as a plurality of device attributes 134 (e.g., a dataset of device attributes and their corresponding client devices). Additionally or alternatively, in several embodiments, the authentication service 132 can further enable transmission (e.g., directly, or indirectly via the network 120) of the plurality of device attributes 116, the plurality of device attributes 156, and the plurality of device attributes 166 to device database 140 for storage and retrieval.

The device database 140 may be a database or repository used to store the plurality of device attributes 116, any other suitable data, or any combination thereof. For example, the device database 140 can store, in a list or as table entries, the plurality of device attributes 116 as a plurality of registered device attributes 144 so that a historic record of the plurality of device attributes 116 of the client device 110 may be accumulated over a period of time. In several embodiments, the plurality of device attributes 116 may be stored in a device profile 142 that includes the plurality of registered device attributes 144. The plurality of registered device attributes 144 (e.g., the collection of the accumulated plurality of device attributes 116) in the device profile 142 can collectively be referred to as a first multitude of values. The device profile 142 refers to a database table or list, specific to a device, for example client device 110, which stores historic records of the plurality of device attributes 116 of the device. As will be described further below, the device profile 142 and the values stored therein may be used by the system 100 to authenticate the client device 110.

In a variety of embodiments, the authentication service 132 of the server 130 can provide for authenticating a client device that is attempting to make a transaction (e.g., a balance transfer, adding an authorized user, etc.) based on, as an augmentation to device fingerprinting techniques, whether the user contacts data on the client device matches some or all of the user contacts data registered (e.g., recorded as authentic) by the server 130 for an authorized user of the account. For example, the client device 110 can be a client device owned and operated by the user 102 whose plurality of device attributes 116 have been registered by the server 130 (e.g., as plurality of device attributes 134 stored in the server 130, as registered device attributes 144 stored in the device database 140, or both). The client device 150 can be another client device (e.g., a new or second client device) also owned and operated by the user 102 but whose plurality of device attributes 156 have not yet been registered by the server 130. The client device 160 can be a fraudulent (e.g., spoofed) client device operated by the user 104.

Continuing this illustrative and non-limiting embodiment, FIG. 1 shows an "authorized" user 102 that should be authorized by server 130 to make a transaction on his or her account using either application 112 on client device 110 (e.g., a registered client device) or application 152 on client device 150 (e.g., an unregistered client device belonging to the user 102, such as an additional or new client device). For example, even when device identification data is limited or not available (e.g., partially or wholly inaccessible by the application 112) for user 102's client device 110, server 130 can authorize the transaction because client device 110 will share some or all of the same user contacts data at different points in time. In another example, although user 102's client device 150 has different device identification data than user 102's client device 110, server 130 can authorize the transaction because the client device 110 and the client device 150 will share some or all of the same user contacts data. FIG. 1 further shows a "fraudulent" user 104 that should not be authorized by server 130 to make a transaction on user 102's account using the application 162 on the client device 160 (e.g., a "spoofed" client device having substantially the same device identification data as the client device 110). For example, although user 104 may spoof the device identification data of the client device 110, server 130 can prevent the transaction because the client device 110 and the client device 160 will not share the same user contacts data (e.g., user 104 will not be able to spoof user 102's user contacts data).

Figure 2:
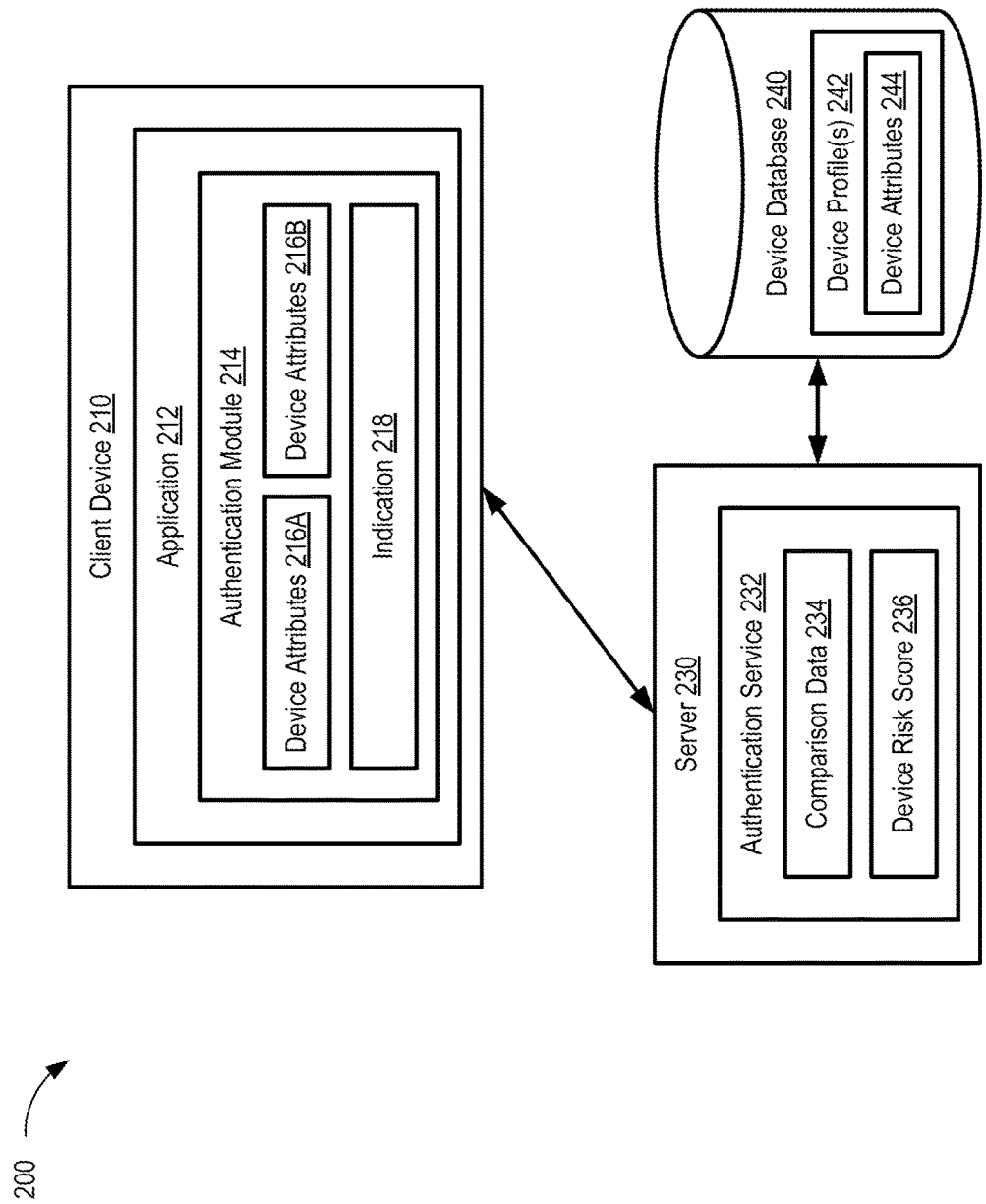
FIG. 2 is an example control flow for an example system for enhanced device fingerprinting according to some embodiments.

FIG. 2 is an example control flow 200 for a computing system, such as the system 100 shown in FIG. 1, according to some embodiments. For example, control flow 200 can provide an example of how the system 100 shown in FIG. 1, or any other suitable computing system, can operate. For the purposes of this example discussion of FIG. 2, it is to be understood that some or all of the application 212, including some or all of the authentication module 214, is installed on the client device 210. It is to be further understood that the authentication service 232 is installed on the server 230.

In several embodiments, control flow 200 may begin by the authentication service 232 of the server 230 receiving, at a first time and from an application 212, a first plurality of device attributes 216A identifying a client device 210 on which the application 212 is being used. The first plurality of device attributes 216A can include first device identification data and first user contacts data as they are stored on, or in association with (e.g., in a cloud computing environment), the client device 210 at the first time. The authentication service 232 of the server 230 can transmit, to a device database 240, the first plurality of device attributes 216A for storage in a device profile 242 (e.g., as a plurality of registered device attributes 244).

Subsequently, the authentication service 232 of the server 230 can receive, at a second time later than the first time and from the application 212, an indication 218 that a user is attempting to perform a transaction using the application 212 on the client device 210. In response to receiving the indication 218, the authentication service 232 of the server 230 can request a second plurality of device attributes 216B identifying the client device 210 on which the application 212 is being used. The second plurality of device attributes 216B can include second device identification data and second user contacts data as they are stored on, or in association with, the client device 210 at the second time. The second plurality of device attributes 216B can be the same as, or different than, the first plurality of device attributes 216A. In response to requesting the second plurality of device attributes 216B, the authentication service 232 of the server 230 can receive the second plurality of device attributes 216B.

The authentication service 232 of the server 230 can compare (e.g., using a pairwise comparison technique performed automatically and without user input) the second plurality of device attributes 216B to the first plurality of device attributes 216A to generate comparison data 234. Based on the comparison data 234, the server 230 can determine a device risk score 236 indicating whether the user is authorized to perform the transaction using the application 212. In one example, the authentication service 232 of the server 230 can determine that the device risk score 236 is equal to or greater than a maximum device risk score threshold value and, in response thereto, prevent the user from performing the transaction using the application 212. In another example, the authentication service 232 of the server 230 can determine that the device risk score 236 is less than the maximum device risk score threshold value and equal to or greater than a minimum device risk score threshold value and, in response thereto, perform a supplemental authentication technique to determine whether the user is authorized to perform the transaction using the application 212. In yet another example, the authentication service 232 of the server 230 can determine that the device risk score 236 is less than the minimum device risk score threshold value and, in response thereto, authorize the user to perform the transaction using the application 212.

In several embodiments, the authentication service 232 of the server 230 can be configured to not treat device attribute comparisons equally. For example, a significant enough difference in user contacts can substantially instantly put the risk score over the maximum threshold. In an alternative embodiment, the authentication service 232 or device database 240 can also maintain a list of attributes known to come from compromised devices or involved in fraudulent transactions. In several embodiments, a substantially similar comparison against these attributes can trigger a high risk score.

For example, the first user contacts data can include first emergency contacts data stored in or associated with the client device 210 at the first time. The second user contacts data can include second emergency contacts data stored in or associated with the client device 210 at the second time. The authentication service 232 of the server 230 can perform the supplemental authentication technique by comparing the first emergency contacts data to the second emergency contacts data and determining, based at least in part on the comparison, a supplemental device risk score indicating whether the user is authorized to perform the transaction. In this example, the authentication service 232 of the server 230 then can: (i) determine that the supplemental device risk score is less than the minimum device risk score threshold value and, in response thereto, authorize the user to perform the transaction using the application 212; (ii) determine that the supplemental device risk score is equal to or greater than the minimum device risk score threshold value and less than the maximum device risk score threshold value and, in response thereto, perform a second supplemental authentication technique to determine whether the user is authorized to perform the transaction using the application 212; and/or (iii) determine that the supplemental device risk score is greater than the maximum device risk score threshold value and, in response thereto, prevent the user from performing the transaction using the application 212. Additionally or alternatively, the authentication service 232 of the server 230 can perform the supplemental authentication technique by determining that a first portion of the first emergency contacts data matches a second portion of the second emergency contacts data (e.g., the first emergency contacts data and the second emergency contacts data have at least one emergency contact in common) and, in response thereto, authorizing the user to perform the transaction using the application 212.

For example, the first user contacts data can include first authorized users data, the second user contacts data can include second authorized users data, and the authentication service 232 of the server 230 can perform the supplemental authentication technique by comparing the first authorized users data to the second authorized users data and determining, based at least in part on the comparison, a supplemental device risk score indicating whether the user is authorized to perform the transaction. The authentication service 232 of the server 230 then can: (i) determine that the supplemental device risk score is less than the minimum device risk score threshold value and, in response thereto, authorize the user to perform the transaction using the application 212; (ii) determine that the supplemental device risk score is equal to or greater than the minimum device risk score threshold value and less than the maximum device risk score threshold value and, in response thereto, perform a second supplemental authentication technique to determine whether the user is authorized to perform the transaction using the application 212; and/or (iii) determine that the supplemental device risk score is greater than the maximum device risk score threshold value and, in response thereto, prevent the user from performing the transaction using the application 212. Additionally or alternatively, the authentication service 232 of the server 230 can perform the supplemental authentication technique by determining that a first portion of the first authorized users data matches a second portion of the second authorized users data (e.g., the first authorized users data and the second authorized users data have at least one authorized user in common) and, in response thereto, authorizing the user to perform the transaction using the application 212. Additionally or alternatively, the authentication service 232 of the server 230 can perform the supplemental authentication technique by determining that the user contacts data included in the second plurality of device attributes 216B includes an authorized user of the user's account (e.g., stored in the device database 240) and, in response thereto, authorizing the user to perform the transaction using the application 212.

For example, the first user contacts data can include first self-contact data for a primary user of the client device 210 at the first time. The second user contacts data can include second self-contact data for the primary user of the client device 210 at the second time. The authentication service 232 of the server 230 can perform the supplemental authentication technique by comparing the first self-contact data to the second self-contact data and determining, based at least in part on the comparison, a supplemental device risk score indicating whether the user is authorized to perform the transaction. The authentication service 232 of the server 230 then can: (i) determine that the supplemental device risk score is less than the minimum device risk score threshold value and, in response thereto, authorize the user to perform the transaction using the application 212; (ii) determine that the supplemental device risk score is equal to or greater than the minimum device risk score threshold value and less than the maximum device risk score threshold value and, in response thereto, perform a second supplemental authentication technique to determine whether the user is authorized to perform the transaction using the application 212; and/or (iii) determine that the supplemental device risk score is greater than the maximum device risk score threshold value and, in response thereto, prevent the user from performing the transaction using the application 212. Additionally or alternatively, the authentication service 232 of the server 230 can perform the supplemental authentication technique by determining that the first self-contact data matches the second self-contact data (e.g., the first self-contact data and the second self-contact data are substantially identical) and, in response thereto, authorizing the user to perform the transaction using the application 212.

For example, the application 212 can be a first application, the client device 210 can be a first client device, the indication 218 can be first indication, the transaction can be a first transaction, the device risk score 236 can be a first device risk score, and the authentication service 232 of the server 230 can receive, at a third time later than the first time and from a second application, a second indication that the user is attempting to perform a second transaction using the second application on a second client device. In response to receiving the second indication, the authentication service 232 of the server 230 can request a third plurality of device attributes identifying the second client device on which the second application is being used. The third plurality of device attributes can be different than the first plurality of device attributes 216A and include third device identification data and third user contacts data. In response to the request, the authentication service 232 of the server 230 can receive the third plurality of device attributes, compare the third plurality of device attributes to the first plurality of device attributes, and determine, based on the comparison, a second device risk score indicating whether the user is authorized to perform the second transaction using the second application. In one example, the authentication service 232 of the server 230 can determine that the second device risk score is equal to or greater than a maximum device risk score threshold value and, in response thereto, prevent the user from performing the second transaction using the second application. In another example, the authentication service 232 of the server 230 can determine that the second device risk score is less than a maximum device risk score threshold value and equal to or greater than a minimum device risk score threshold value and, in response thereto, perform a supplemental authentication technique to determine whether the user is authorized to perform the second transaction using the second application. In yet another example, the authentication service 232 of the server 230 can determine that the second device risk score is less than a minimum device risk score threshold value and, in response thereto, authorize the user to perform the second transaction using the second application.

In several embodiments, the authentication service 232 of the server 230 can provide for authenticating the client device 210 (e.g., to authorize or otherwise permit an account transaction requested by a user using the application 212) by matching up data received from the client device 210 with registered or recorded data stored in the server 230, the device database 240, or both. For example, the authentication service 232 of the server 230 can authenticate the client device 210 by matching one or more emergency contacts data included in the plurality of device attributes 216 with one or more authorized users of the account stored in the server 230, the device database 240, or both. In another example, the authentication service 232 of the server 230 can authenticate the client device 210 by matching one or more contacts in the user's contacts list included in the plurality of device attributes 216 with one or more authorized users of the account stored in the server 230, the device database 240, or both. In another example, the authentication service 232 of the server 230 can authenticate the client device 210 by matching the name, date of birth, social security number, and address of a contact in the user's contacts list included in the plurality of device attributes 216 with the name, date of birth, social security number, and address of an authorized user of the account stored in the server 230, the device database 240, or both. In another example, the authentication service 232 of the server 230 can authenticate the client device 210 by matching the name and address of a self-contact included in the plurality of device attributes 216 with the name and address of an authorized user of the account stored in the server 230, the device database 240, or both. In another example, the authentication service 232 of the server 230 can authenticate the client device 210 by matching the contact points of a self-contact included in the plurality of device attributes 216 with the contact points of an authorized user of the account stored in the server 230, the device database 240, or both. In another example, the authentication service 232 of the server 230 can authenticate the client device 210 by matching (e.g., during a government identification challenge) the driver's license or passport of a self-contact included in the plurality of device attributes 216 with the driver's license or passport of an authorized user of the account stored in the server 230, the device database 240, or both.

In several embodiments, the authentication service 232 of the server 230 can provide for authenticating the client device 210 by detecting that the client device 210 is a new client device of an authorized user (e.g., because the user contacts data carries over from a registered device to a new device and works across platform swaps, such as from Android to iOS). In several embodiments, the authentication service 232 of the server 230 can utilize the contact-matching techniques disclosed herein when: (i) a user attempts to sign in with an unknown device; (ii) a user attempts to view a complete credit card information (e.g., 16-digit card number plus card verification value (CVV) plus expiration data); (iii) a user attempts a balance transfer; (iv) a user attempts provisioning a mobile payment or digital wallet service; (v) a user attempts to add an authorized user to the account; (vi) a user attempts to enroll or otherwise sign up for online banking or credit services; (vii) a user attempts to link an account to a new product (e.g., a new credit card); (viii) a user attempts to activate a new credit or debit card; (ix) when a user attempts to update a phone number, email address, or physical address in the application 212; any other suitable transaction is attempted; or any combination thereof. In several embodiments, when a user calls into a call center, an automated or human call center agent can prompt the user to open the application 212 to authenticate the client device 210 using any technique or combination of techniques disclosed herein.

In several embodiments, the authentication service 232 of the server 230 can provide for authenticating the client device 210 by detecting that the client device 210 is a joint account holder (e.g., a spouse of an authorized user) that shares the same account as the authorized user. In several embodiments, the "user" may be associated with multiple different devices.

In several embodiments, the risk score can include a frequency of use of a trusted device to remove outdated data and identify possible fraudulent activities. For example, if a user gets a new device, the previous device is still trusted, but after a time limit (e.g., an adjustable period of time) the previous device's risk score can become less trusted. In another example, if a user uses someone else's device once and does not want that device to always be trusted over a period of time, that device's risk score can become less trusted.

By way of example, the authentication service 232 can implement the determinations described above by implementing a system of rules or if-else statements. In several embodiments, the rules or if-else statement can have conditions such as:

If the device risk score 236 is equal to or greater than a first threshold value, the device is not trustworthy and thus the authentication service 232 should prevent the client device 210 and/or user from performing the transaction.

If the device risk score 236 is equal to or greater than a second threshold value and is less than the first threshold value, the authentication service 132 should perform additional authentication to determine whether to authorize the client device 210 and/or user to perform the transaction.

If the device risk score 236 is less than the second threshold value, the device is trustworthy and thus the authentication service 232 should authorize the client device 210 and/or user to perform the high-risk transaction.

The aforementioned rules or if-else statements are examples and not meant to be limiting. In several embodiments, if rules or if-else statements are put in place to require additional authentication based on a value for the device risk score 236, the authentication service 232 can implement the additional authentication (e.g., supplemental authentication).

In several embodiments, machine learning processes may be incorporated into the aforementioned authentication processes of control flow 200. In one illustrative and non-limiting example, an authentication machine learning model can be trained to determine whether the differences between a user's contact point list "modification velocity" is significant enough to be flagged as fraudulent. The authentication machine learning model can also be trained to identify outliers, such as: (i) if the user's contacts have been steady for years of fingerprints, then adding five contacts per week for a couple weeks straight might indicate fraud; or (ii) if the user's contacts list has been continually growing at a steady velocity (e.g., the user is very sociable), then that activity might not indicate fraud. In several embodiments, the authentication machine learning model can be retroactively trained against existing data sessions and fingerprints along with reported fraud incidents. In several embodiments, the authentication machine learning model can be used to determine the amount that the "self" or "me" contact aligns with the information on file (e.g., at a financial institution) about a user (e.g., if the user has their name in the email address, etc.). In several embodiments, the authentication machine learning model can be trained on how each user fills out their individual contacts within the list (e.g., some users fill out both first and last name, some users use only a last name initial, or some users like to give nicknames to their contacts), and the authentication machine learning model can monitor for outliers between how new contacts are input in comparison to how past contacts have been inputted by the same user.

The aforementioned control flow 200 may be performed by the modules, units, or services of the client device 210 and the server 230 and may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as part of the system 100 and/or installed as a removable portion of the system 100.

In some aspects, system 100 described above significantly improves the state of the art from previous systems because it provides an enhanced method of performing device fingerprinting. The enhancement stems from the use of user contacts data in conjunction with the device identification values of the plurality of device attributes 116 to provide an enhanced device fingerprint. Based on the aforementioned information, a device risk score 236 used to authenticate a device is determined. By using the user contacts data, the values used to fingerprint devices become more trustworthy. This is because in order for a nefarious user to compromise a client device of the system 100 and attempt to imitate the client device, a nefarious user needs to obtain both the device identification data of the client device and the user contacts data of the client device. This would require the nefarious user to infiltrate multiple components of the device itself to obtain all the information needed to imitate the user 102 and/or the client device 110, which is difficult to do and thus unlikely to occur.

Furthermore, the use of historic device information, such as the values stored in the device profile 142, allows the system 100 to provide a better authentication of devices. This is because the determination is based on trends and device information, rather than individual snapshots of device information, to determine whether a device is trustworthy. The trends allow the system to determine what a device fingerprint typically looks like over a period of time. If the second plurality of device attributes 216B matches or is similar to the historic information, it can provide a good indication that the device is a trustworthy device.

Further still, the addition of a user's contacts as an additional signal or data point in the device fingerprint allows the system 100 to provide a better authentication of devices because, for example, these fields may not change often, or at all, making them good candidates for inclusion in the device fingerprint. Collection of this data is more-or-less accessible to mobile apps as opposed to device identification data like SIM card serial numbers. In addition, emergency contacts are not often updated by users, making them substantially stable for use in the device fingerprint. Flexibility can be considered if a contact is added or removed from the list because rarely is the entire list replaced. Further, while the total number of contacts in the user's contact list may be updated more frequently than emergency contacts, the total number of contacts may change as a result of single additions or removals of contacts rather than a complete replacement of new values.

Methods of Operation

Figure 3:
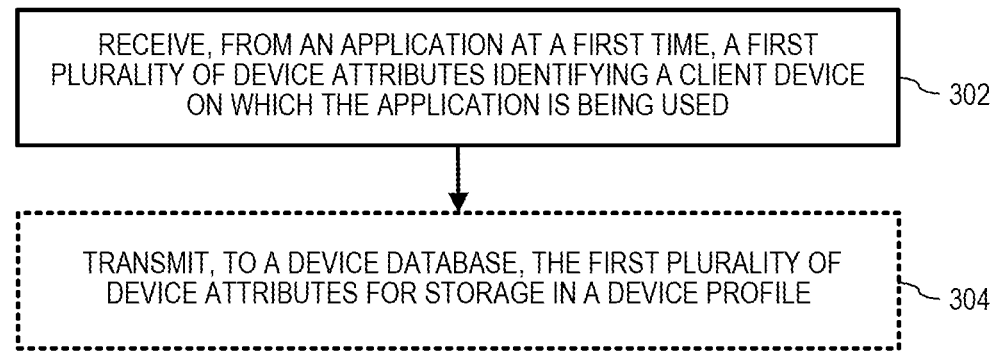
FIG. 3 is an example method for enhanced device fingerprinting according to some embodiments.

FIG. 3 is an example method 300 of operating the system 100 (and, in some aspects, the control flow 200) to provide for enhanced device fingerprinting according to some embodiments. For example, method 300 indicates how the server 130 operates at a first time.

In several embodiments, operation 302 operates to allow the server 130 to receive, at the first time by one or more computing devices and from an application 112, a first plurality of device attributes (e.g., plurality of device attributes 116 at a first time) identifying a client device 110 on which the application 112 is being used. The first plurality of device attributes can include first device identification data and first user contacts data as they are stored on, or in association with (e.g., in a cloud computing environment), the client device 110 at the first time.

In optional operation 304, the server 130 transmits, by the one or more computing devices and to a device database 140, the first plurality of device attributes for storage in a device profile 142 (e.g., as a plurality of registered device attributes 144).

Figure 4:
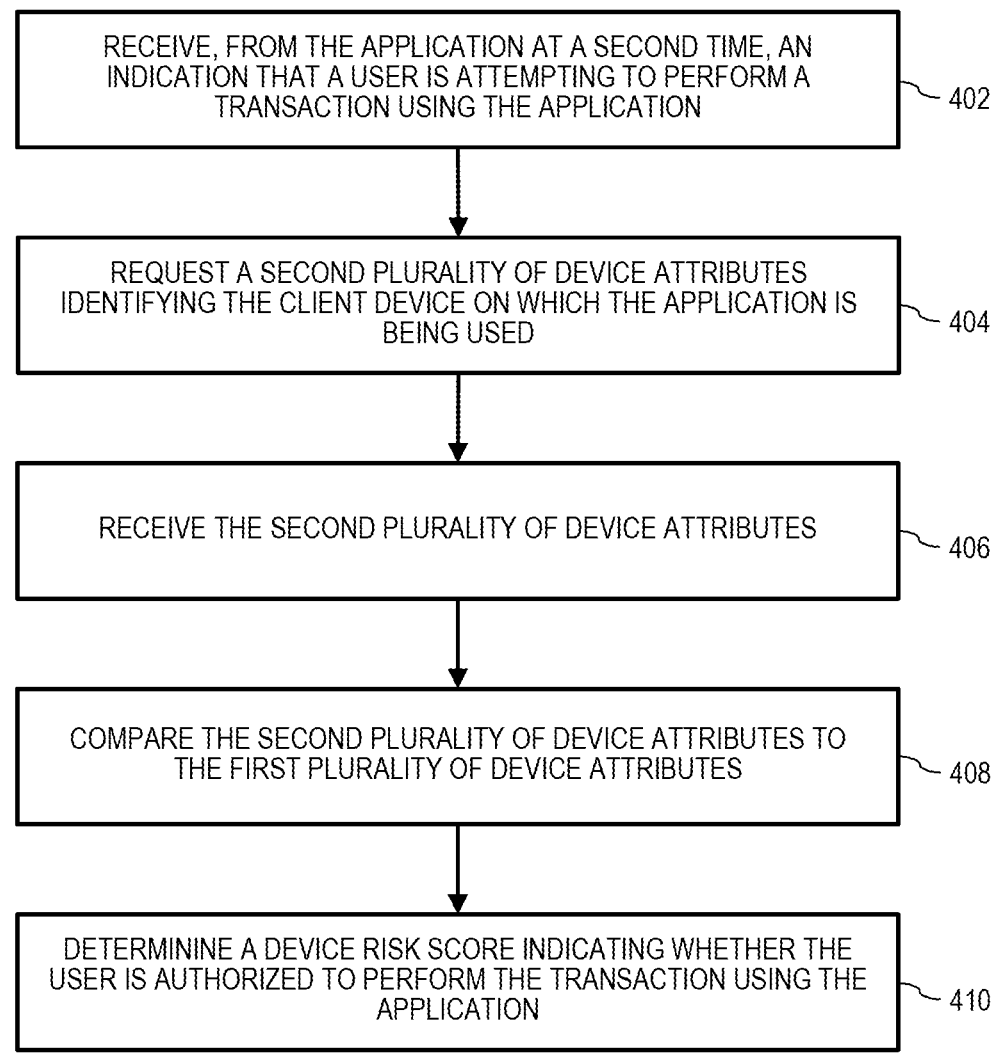
FIG. 4 is another example method for enhanced device fingerprinting according to some embodiments.

FIG. 4 is a further example method 400 of operating the system 100 (and, in some aspects, the control flow 200) to provide for enhanced device fingerprinting according to some embodiments. In one embodiment, method 400 indicates how the server 130 operates at a second time later than the first time.

In several embodiments, operation 402 operates to allow the server 130 to receive, at the second time by the one or more computing devices and from the application 112, an indication 218 that a user 102 is attempting to perform a transaction using the application 112 on the client device 110.

In several embodiments, in operation 404 in response to receiving the indication 218, the server 130 requests, by the one or more computing devices, a second plurality of device attributes (e.g., plurality of device attributes 116 at a second time later than the first time) identifying the client device 110 on which the application 112 is being used. The second plurality of device attributes can be different than the first plurality of device attributes and include second device identification data and second user contacts data as they are stored on, or in association with, the client device 110 at the second time.

In several embodiments, in operation 406 in response to requesting the second plurality of device attributes, the server 130 can receive, by the one or more computing devices, the second plurality of device attributes.

In several embodiments, in operation 408 the server 130 can compare, by the one or more computing devices (e.g., using a pairwise comparison technique performed automatically and without user input), the second plurality of device attributes to the first plurality of device attributes to generate comparison data 234.

In several embodiments, in operation 410, based on the comparison data 234, the server 130 can determine, by the one or more computing devices, a device risk score 236 indicating whether the user 102 is authorized to perform the transaction using the application 112.

In some embodiments, operation of methods 300 and 400 are performed, for example, by system 100 or the functional units or devices described with reference to control flow 200, in accordance with embodiments described above.

Components of the System

Figure 5:
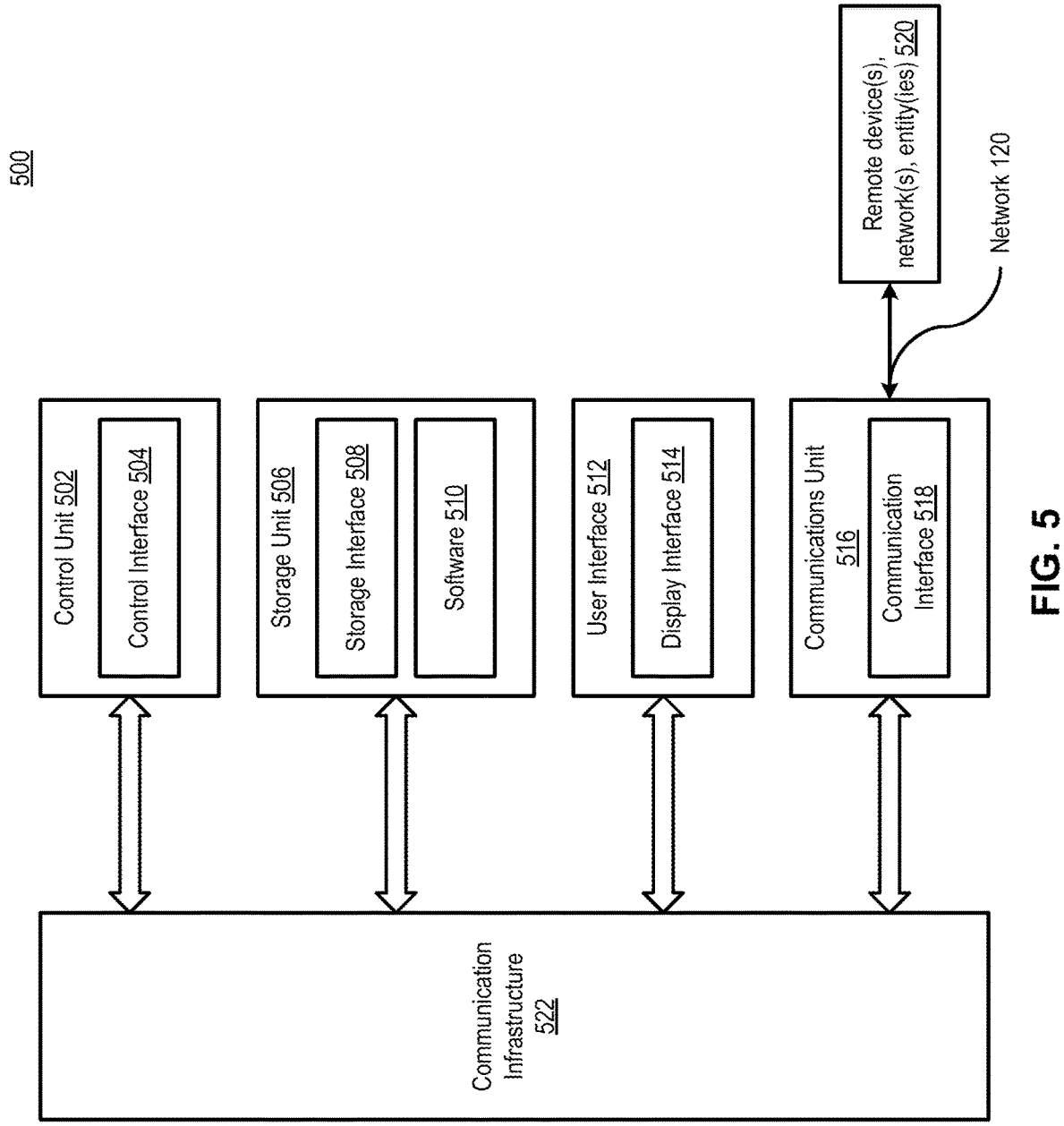
FIG. 5 is an example architecture of components implementing an example system for enhanced device fingerprinting according to some embodiments.

FIG. 5 is an example architecture 500 of components implementing the system 100 according to some embodiments. The components may be implemented by any of the devices described with reference to the system 100, such as the client device 110, the client device 150, the client device 160, the server 130, the device database 140, or a combination thereof. The components may be further implemented by any of the devices described with reference to the control flow 200, such as the client device 210, the server 230, the device database 240, or a combination thereof.

In several embodiments, the components may include a control unit 502, a storage unit 506, a communication unit 516, and a user interface 512. The control unit 502 may include a control interface 504. The control unit 502 may execute a software 510 (e.g., the application 112, the authentication module 114, the application 152, the authentication module 154, the application 162, the authentication module 164, the authentication service 132, or a combination thereof) to provide some or all of the machine intelligence described with reference to system 100. In another example, the control unit 502 may execute a software 510 (e.g., the application 212, the authentication module 214, the authentication service 232, or a combination thereof) to provide some or all of the machine intelligence described with reference to control flow 200.

The control unit 502 may be implemented in a number of different ways. For example, the control unit 502 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 504 may be used for communication between the control unit 502 and other functional units or devices of system 100 (e.g., the client device 110, the client device 150, the client device 160, the server 130, the device database 140, or a combination thereof) or those described with reference to control flow 200 (e.g., the application 212, the authentication module 214, the authentication service 232, or a combination thereof). The control interface 504 may also be used for communication that is external to the functional units or devices of system 100 or those described with reference to control flow 200. The control interface 504 may receive information from the functional units or devices of system 100 or control flow 200, or from remote devices 520, or may transmit information to the functional units or devices of system 100 or control flow 200, or to remote devices 520. The remote devices 520 refer to units or devices external to system 100 or control flow 200.

The control interface 504 may be implemented in different ways and may include different implementations depending on which functional units or devices of system 100, control flow 200, or remote devices 520 are being interfaced with the control unit 502. For example, the control interface 504 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 504 may be connected to a communication infrastructure 522, such as a bus, to interface with the functional units or devices of system 100, control flow 200, or remote devices 520.

The storage unit 506 may store the software 510. For illustrative purposes, the storage unit 506 is shown as a single element, although it is understood that the storage unit 506 may be a distribution of storage elements. Also for illustrative purposes, the storage unit 506 is shown as a single hierarchy storage system, although it is understood that the storage unit 506 may be in a different configuration. For example, the storage unit 506 may be formed with different storage technologies forming a memory hierarchical system including different levels of caching, main memory, rotating media, or off-line storage. The storage unit 506 may be a volatile memory, a nonvolatile memory, an internal memory, an external memory, or a combination thereof. For example, the storage unit 506 may be a nonvolatile storage such as nonvolatile random access memory (NVRAM), Flash memory, disk storage, or a volatile storage such as static random access memory (SRAM) or dynamic random access memory (DRAM).

The storage unit 506 may include a storage interface 508. The storage interface 508 may be used for communication between the storage unit 506 and other functional units or devices of system 100 or control flow 200. The storage interface 508 may also be used for communication that is external to system 100 or control flow 200. The storage interface 508 may receive information from the other functional units or devices of system 100, control flow 200, or from remote devices 520, or may transmit information to the other functional units or devices of system 100 or to remote devices 520. The storage interface 508 may include different implementations depending on which functional units or devices of system 100, control flow 200, or remote devices 520 are being interfaced with the storage unit 506. The storage interface 508 may be implemented with technologies and techniques similar to the implementation of the control interface 504.

The communication unit 516 may enable communication to devices, components, modules, or units of system 100, control flow 200, or remote devices 520. For example, the communication unit 516 may permit the system 100 to communicate between the client device 110, the client device 150, the client device 160, the server 130, the device database 140, or a combination thereof. In another example, the communication unit 516 may permit the functional units or devices described with reference to control flow 200 to communicate between the client device 210, the server 230, the device database 240, or a combination thereof. The communication unit 516 may further permit the devices of system 100 or control flow 200 to communicate with remote devices 520 such as an attachment, a peripheral device, or a combination thereof through the network 120.

As previously indicated, the network 120 may span and represent a variety of networks and network topologies. For example, the network 120 may include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 120. Cable, Ethernet, digital subscriber line (DSL), fiber optic lines, fiber to the home (FTTH), and plain old telephone service (POTS) are examples of wired communication that may be included in the network 120. Further, the network 120 may traverse a number of network topologies and distances. For example, the network 120 may include direct connection, personal area network (PAN), local area network (LAN), metropolitan area network (MAN), wide area network (WAN), or a combination thereof.

The communication unit 516 may also function as a communication hub allowing system 100 to function as part of the network 120 and not be limited to be an end point or terminal unit to the network 120. The communication unit 516 may include active and passive components, such as microelectronics or an antenna, for interaction with the network 120.

The communication unit 516 may include a communication interface 518. The communication interface 518 may be used for communication between the communication unit 516 and other functional units or devices of system 100 or to remote devices 520. The communication interface 518 may receive information from the other functional units or devices of system 100, or from remote devices 520, or may transmit information to the other functional units or devices of the system 100 or to remote devices 520. The communication interface 518 may include different implementations depending on which functional units or devices are being interfaced with the communication unit 516. The communication interface 518 may be implemented with technologies and techniques similar to the implementation of the control interface 504.

The user interface 512 may present information generated by system 100. In several embodiments, the user interface 512 allows a user to interface with the devices of system 100 or remote devices 520. The user interface 512 may include an input device and an output device. Examples of the input device of the user interface 512 may include a keypad, buttons, switches, touchpads, soft-keys, a keyboard, a mouse, or any combination thereof to provide data and communication inputs. Examples of the output device may include a display interface 514. The control unit 502 may operate the user interface 512 to present information generated by system 100. The control unit 502 may also execute the software 510 to present information generated by system 100, or to control other functional units of system 100. The display interface 514 may be any graphical user interface such as a display, a projector, a video screen, or any combination thereof.

The above detailed description and embodiments of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The system 100, the control flow 200, the method 300, and the method 400 are cost-effective, highly versatile, and accurate, and may be implemented by adapting components for ready, efficient, and economical manufacturing, application, and utilization. Another important aspect of embodiments of the present disclosure is that they valuably support and service the trend of reducing costs, simplifying systems, and/or increasing system performance.

These and other valuable aspects of the embodiments of the present disclosure consequently further the state of the technology to at least the next level. While the disclosed embodiments have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the disclosure is not to be restricted except in light of the attached claims and their equivalents.

What is claimed is:

1. A computer-implemented method for device fingerprinting, the computer-implemented method comprising:

receiving, at a first time by one or more computing devices and from an application, a first plurality of device attributes identifying a client device on which the application is being used, wherein the first plurality of device attributes comprises first device identification data and a total number of contacts in a first user's contact list;

receiving, at a second time by the one or more computing devices and from the application, an indication that a user is attempting to perform a transaction using the application on the client device;

requesting, by the one or more computing devices and in response to receiving the indication, a second plurality of device attributes identifying the client device on which the application is being used, wherein the second plurality of device attributes is different than the first plurality of device attributes and comprises second device identification data and a total number of contacts in a second user's contact list;

receiving, by the one or more computing devices and in response to requesting the second plurality of device attributes, the second plurality of device attributes;

comparing, by the one or more computing devices, the second plurality of device attributes to the first plurality of device attributes; and determining, by the one or more computing devices and based on the comparing the second plurality of device attributes to the first plurality of device attributes, a device risk score indicating whether the user is authorized to perform the transaction using the application.

2. The computer-implemented method of claim 1, further comprising:
   determining, by the one or more computing devices, that the device risk score is equal to or greater than a maximum device risk score threshold value; and
   preventing, by the one or more computing devices and in response to determining that the device risk score is equal to or greater than the maximum device risk score threshold value, the user from performing the transaction using the application.

3. The computer-implemented method of claim 1, further comprising:
   determining, by the one or more computing devices, that the device risk score is less than a maximum device risk score threshold value and equal to or greater than a minimum device risk score threshold value; and
   performing, by the one or more computing devices and in response to determining that the device risk score is less than the maximum device risk score threshold value and equal to or greater than the minimum device risk score threshold value, a supplemental authentication technique to determine whether the user is authorized to perform the transaction using the application.

4. The computer-implemented method of claim 1, further comprising:
   determining, by the one or more computing devices, that the device risk score is less than a minimum device risk score threshold value; and
   authorizing, by the one or more computing devices and in response to determining that the device risk score is less than the minimum device risk score threshold value, the user to perform the transaction using the application.

5. The computer-implemented method of claim 1, wherein:
   the application is a first application;
   the client device is a first client device;
   the indication is a first indication;
   the transaction is a first transaction;
   the device risk score is a first device risk score; and
   the computer-implemented method further comprises:
      receiving, at a third time by the one or more computing devices and from a second application, a second indication that the user is attempting to perform a second transaction using the second application on a second client device;
      requesting, by the one or more computing devices and in response to receiving the second indication, a third plurality of device attributes identifying the second client device on which the second application is being used, wherein the third plurality of device attributes is different than the first plurality of device attributes and comprises third device identification data and third user contacts data;
      receiving, by the one or more computing devices and in response to requesting the third plurality of device attributes, the third plurality of device attributes;
      comparing, by the one or more computing devices, the third plurality of device attributes to the first plurality of device attributes; and
      determining, by the one or more computing devices and based on the comparing the third plurality of device attributes to the first plurality of device attributes, a second device risk score indicating whether the user is authorized to perform the second transaction using the second application.

6. A non-transitory computer readable medium including instructions for causing a processor to perform operations for device fingerprinting, the operations comprising:
   receiving, at a first time and from an application, a first plurality of device attributes identifying a client device on which the application is being used, wherein the first plurality of device attributes comprises first device identification data and a total number of contacts in a first user's contact list;
   receiving, at a second time and from the application, an indication that a user is attempting to perform a transaction using the application on the client device;
   requesting, in response to receiving the indication, a second plurality of device attributes identifying the client device on which the application is being used, wherein the second plurality of device attributes is different than the first plurality of device attributes and comprises second device identification data and a total number of contacts in a second user's contact list;
   receiving, in response to requesting the second plurality of device attributes, the second plurality of device attributes;
   comparing the second plurality of device attributes to the first plurality of device attributes; and
   determining, based on the comparing the second plurality of device attributes to the first plurality of device attributes, a device risk score indicating whether the user is authorized to perform the transaction using the application.

7. The non-transitory computer readable medium of claim 6, wherein the operations further comprise:
   determining that the device risk score is equal to or greater than a maximum device risk score threshold value; and
   preventing, in response to determining that the device risk score is equal to or greater than the maximum device risk score threshold value, the user from performing the transaction using the application.

8. The non-transitory computer readable medium of claim 6, wherein the operations further comprise:
   determining that the device risk score is less than a maximum device risk score threshold value and equal to or greater than a minimum device risk score threshold value; and
   performing, in response to determining that the device risk score is less than the maximum device risk score threshold value and equal to or greater than the minimum device risk score threshold value, a supplemental authentication technique to determine whether the user is authorized to perform the transaction using the application.

9. The non-transitory computer readable medium of claim 6, wherein the operations further comprise:
   determining that the device risk score is less than a minimum device risk score threshold value; and
   authorizing, in response to determining that the device risk score is less than the minimum device risk score threshold value, the user to perform the transaction using the application.

10. The non-transitory computer readable medium of claim 6, wherein:
   the application is a first application;
   the client device is a first client device;
   the indication is a first indication;
   the transaction is a first transaction;

the device risk score is a first device risk score; and
the operations further comprise:
- receiving, at a third time and from a second application, a second indication that the user is attempting to perform a second transaction using the second application on a second client device;
- requesting, in response to receiving the second indication, a third plurality of device attributes identifying the second client device on which the second application is being used, wherein the third plurality of device attributes is different than the first plurality of device attributes and comprises third device identification data and third user contacts data;
- receiving, in response to requesting the third plurality of device attributes, the third plurality of device attributes;
- comparing the third plurality of device attributes to the first plurality of device attributes; and
- determining, based on the comparing the third plurality of device attributes to the first plurality of device attributes, a second device risk score indicating whether the user is authorized to perform the second transaction using the second application.

11. A computing system for device fingerprinting comprising:
- a storage unit configured to store instructions;
- a communication unit, coupled to the storage unit, configured to process the stored instructions to:
  - receive, at a first time and from an application, a first plurality of device attributes identifying a client device on which the application is being used, wherein the first plurality of device attributes comprises first device identification data and a total number of contacts in a first user's contact list;
  - receive, at a second time and from the application, an indication that a user is attempting to perform a transaction using the application on the client device;
  - transmit, in response to a receipt of the indication, a request for a second plurality of device attributes identifying the client device on which the application is being used, wherein the second plurality of device attributes is different than the first plurality of device attributes and comprises second device identification data and a total number of contacts in a second user's contact list; and
  - receive, in response to a transmission of the request for the second plurality of device attributes, the second plurality of device attributes; and
- a control unit, coupled to the storage unit, configured to process the stored instructions to:
  - compare the second plurality of device attributes to the first plurality of device attributes; and
  - determine, based on a comparison of the second plurality of device attributes to the first plurality of device attributes, a device risk score indicating whether the user is authorized to perform the transaction using the application.

12. The computing system of claim 11, wherein the control unit is further configured to process the stored instructions to:
- determine that the device risk score is equal to or greater than a maximum device risk score threshold value; and
- prevent, in response to the determination that the device risk score is equal to or greater than the maximum device risk score threshold value, the user from performing the transaction using the application.

13. The computing system of claim 11, wherein the control unit is further configured to process the stored instructions to:
- determine that the device risk score is less than a maximum device risk score threshold value and equal to or greater than a minimum device risk score threshold value; and
- perform, in response to the determination that the device risk score is less than the maximum device risk score threshold value and equal to or greater than the minimum device risk score threshold value, a supplemental authentication technique to determine whether the user is authorized to perform the transaction using the application.

14. The computing system of claim 11, wherein:
- the application is a first application;
- the client device is a first client device;
- the request is a first request;
- the indication is a first indication;
- the transaction is a first transaction;
- the device risk score is a first device risk score;
- the communication unit is further configured to process the stored instructions to:
  - receive, at a third time and from a second application, a second indication that the user is attempting to perform a second transaction using the second application on a second client device;
  - transmit, in response to receipt of the second indication, a second request for a third plurality of device attributes identifying the second client device on which the second application is being used, wherein the third plurality of device attributes is different than the first plurality of device attributes and comprises third device identification data and third user contacts data; and
  - receive, in response to a transmission of the second request, the third plurality of device attributes; and
- the control unit is further configured to process the stored instructions to:
  - compare the third plurality of device attributes to the first plurality of device attributes; and
  - determine, based on a comparison of the third plurality of device attributes to the first plurality of device attributes, a second device risk score indicating whether the user is authorized to perform the second transaction using the second application.

\* \* \* \* \*